US009261153B2

(12) United States Patent
Miller (10) Patent No.: US 9,261,153 B2
(45) Date of Patent: Feb. 16, 2016

(54) METHOD FOR CONTROLLING AN ELECTRIC LINING WEAR COMPENSATOR DEVICE FOR A DISK BRAKE ARRANGEMENT AND DISK BRAKE

(71) Applicant: KNORR-BREMSE Systeme fuer Nutzfahrzeuge GmbH, Munich (DE)

(72) Inventor: Bernhard Miller, Weil der Stadt (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/611,749

(22) Filed: Feb. 2, 2015

(65) Prior Publication Data
US 2015/0176668 A1 Jun. 25, 2015

Related U.S. Application Data

(63) Continuation of application No. PCT/EP2013/065542, filed on Jul. 23, 2013.

(30) Foreign Application Priority Data

Aug. 3, 2012 (DE) .......................... 10 2012 015 377

(51) Int. Cl.
*F16D 65/52* (2006.01)
*F16D 55/2255* (2006.01)
*F16D 65/56* (2006.01)
*F16D 66/00* (2006.01)
*F16D 65/38* (2006.01)

(52) U.S. Cl.
CPC ............ *F16D 65/52* (2013.01); *F16D 55/2255* (2013.01); *F16D 65/568* (2013.01); *F16D 66/00* (2013.01); *F16D 2065/386* (2013.01)

(58) Field of Classification Search
CPC . F16D 65/852; F16D 65/568; F16D 55/2255; F16D 66/00; F16D 2065/386
See application file for complete search history.

(56) References Cited

U.S. PATENT DOCUMENTS 4,966,255 A * 10/1990 Fossum .................. F16D 59/02
188/171
6,250,434 B1 * 6/2001 Baumgartner ........ F16D 65/568
188/196 R (Continued)

FOREIGN PATENT DOCUMENTS

| DE | 101 56 503 A1 | 6/2003 |
| DE | 10 2008 017 225 A1 | 10/2009 |
| EP | 1 476 673 B1 | 9/2005 |
| WO | WO 03/069181 A1 | 8/2003 |
| WO | WO 2005/028904 A1 | 3/2005 |

OTHER PUBLICATIONS

International Preliminary Report on Patentability (PCT/IB/326 & PCT/IB/373) including Written Opinion (PCT/ISA/237) dated Feb. 12, 2015 with English translation (11 pages).
German Office Action dated Nov. 7, 2012 (Six (6) pages).
International Search Report (PCT/ISA/210) dated Dec. 2, 2013 with English-language translation (Four (4) pages).

*Primary Examiner* — Mussa A Shaawat
*Assistant Examiner* — Kelly D Williams
(74) *Attorney, Agent, or Firm* — Crowell & Moring LLP (57) ABSTRACT

A method for controlling an electric pad wear compensator device of a disc brake arrangement, in particular for a motor vehicle, and a corresponding disk brake arrangement is provided. The disk brake arrangement includes control device that controls air clearance between a brake pad and a brake disk, a brake application device with a brake applicator lever coupled to the electric pad wear compensator device, and a readjustment spindle which receives at least a portion of the electric pad wear compensator device. The method for controlling the electric pad wear compensator device includes sensing the air clearance of the disc brake, comparing the detected air clearance with a preset value, and controlling the electric pad wear compensator device to adjust the air clearance to the preset value by energizing a solenoid of a coupling device of the electric pad wear compensator device during brake applicator lever movement.

16 Claims, 5 Drawing Sheets

(56) References Cited

U.S. PATENT DOCUMENTS

| | | |
|---|---|---|
| 7,032,721 B2 | 4/2006 | Baumgartner |
| 2005/0077126 A1* | 4/2005 | Baumgartner ........ F16D 65/183 188/218 XL |
| 2005/0241894 A1 | 11/2005 | Baumgartner et al. |
| 2013/0025983 A1* | 1/2013 | Wolf ....................... F16D 65/14 188/72.4 |
| 2014/0345985 A1* | 11/2014 | Miller .................... F16D 65/64 188/79.55 |

* cited by examiner

METHOD FOR CONTROLLING AN ELECTRIC LINING WEAR COMPENSATOR DEVICE FOR A DISK BRAKE ARRANGEMENT AND DISK BRAKE

CROSS REFERENCE TO RELATED APPLICATIONS

This application is a continuation of PCT International Application No. PCT/EP2013/065542, filed Jul. 23, 2013, which claims priority under 35 U.S.C. §119 from German Patent Application No. 10 2012 015 377.5, filed Aug. 3, 2012, the entire disclosures of which are herein expressly incorporated by reference.

BACKGROUND AND SUMMARY OF THE INVENTION

The invention relates to a method for controlling an electric pad wear readjustment device of a disk brake arrangement, in particular for a motor vehicle. The invention also relates to a corresponding disk brake arrangement and to a disk brake.

Pad wear readjustment devices of said type are known in a variety of embodiments, such as for example mechanical readjusters with automatic adjustment of a friction point. In this case, the readjustment device is activated during every brake actuation, for example by way of a feed element of a brake-application device of the disk brake. In the event of wear of brake pads and brake disk, automatic readjustment of the pads is performed by means of the readjustment device, for example by way of an adjustment movement of pressure plungers of variable length.

European Patent Document No. EP 1 476 673 B1 describes a disk brake with a readjustment device driven by electric motor, and a method for controlling a disk brake.

Said arrangements have been proven in practice. However, microscopic mechanical movements and/or vibrations can impair a readjustment, that is to say a readjustment is for example performed incompletely, wherein an air clearance is too large, thus necessitating corresponding excess energy for braking processes. Possibilities for intervention for the purpose of preventing such impairment are not known.

It is the object of the present invention to provide an improved method for controlling a pad wear readjustment device for a disk brake arrangement.

It is a further object to provide an improved disk brake arrangement.

The electric pad wear readjustment device is controlled by energization of a clutch device of the electric pad wear readjustment device during a movement of the brake feed lever. The transmission of the torque produced by said brake feed lever to a readjustment spindle can be controlled by means of the switchable clutch device in a simple manner by way of a switch, for example a relay and/or a semiconductor switch.

A method according to the invention for controlling an electric pad wear readjustment device of a disk brake arrangement, in particular for a motor vehicle, with a disk brake and a control device, wherein the disk brake has a brake-application device with a brake feed lever, wherein the pad wear readjustment device is coupled to the brake feed lever and is preferably inserted into a readjustment spindle of the disk brake, comprises the following method steps: (S1) detecting an air clearance of the disk brake; (S2) identifying a change in the air clearance by comparison with preset values; and (S3) controlling the electric pad wear readjustment device by energizing an electromagnetic coil.

A disk brake arrangement according to the invention for carrying out the method according to one of the preceding claims has a disk brake, in particular for a motor vehicle, with a brake-application device with a brake feed lever, an electric pad wear readjustment device which is preferably insertable into a readjustment spindle of the disk brake, and a control device, wherein the electric pad wear readjustment device is coupled to the brake feed lever. The electric pad wear readjustment device comprises a readjustment shaft with an outer bearing; a rotary drive element; and a clutch device for the switchable coupling of the rotary drive element to the readjustment shaft. The clutch device is of electrically switchable form with at least one electromagnetic coil.

The brake feed lever can move without torque being transmitted in the electric pad wear readjustment device to the readjustment spindle. Only when the clutch device is activated is torque transmitted to the readjustment spindle.

Further advantageous refinements are specified in the sub-claims.

In one embodiment, during the detection of the air clearance of the disk brake, a lever feed travel of the brake feed lever is detected. In this way, it is possible to identify whether the brake feed lever is situated in a range in which the air clearance is being passed through.

In a further embodiment, during the detection of the air clearance of the disk brake, a friction point is determined on the basis of the transmission of force by a readjustment spindle of the electric pad wear readjustment device, by virtue of the lever feed travel of the brake feed lever and an adjustment movement of the pad wear readjustment device in the event of energization of the electromagnetic coil being detected. If, during a feed movement of the brake feed lever, an adjustment movement takes place at the same time but then stops despite a further feed movement, the friction point has been reached. This may also be the case if no adjustment movement takes place at the start of a feed movement.

According to a yet further embodiment, it is possible for the energization of the electromagnetic coil to take place in a manner dependent on a detected movement of the brake feed lever. This is possible if a combination of pad wear sensor and feed lever sensor is provided in the pad wear readjustment device.

In another embodiment, during the detection of the air clearance of the disk brake, a pressure measurement may be performed at a preset braking point in comparison with a preset setpoint characteristic curve. Additional monitoring of the friction point can be realized in this way. Furthermore, it is possible in this case for reliability of pressure regulation to be improved by way of rapid fault detection in the event of a faulty pressure sensor.

In this case, an identification of a friction point may be performed by the evaluation of a measured static brake pressure in a manner dependent on a movement of the brake feed lever. In this case, it may for example be provided that a setpoint characteristic curve is stored in table form in a memory device and can be taken into consideration for comparison purposes.

The control of the electric pad wear readjustment device by energization of the electromagnetic coil during a brake-application movement of the brake feed lever for the purpose of readjustment of the electric pad wear readjustment device is performed if a change in the air clearance in the sense of an increase of the air clearance has been identified.

It is however also possible for an excessively small air clearance to be reset to a presettable value again. For this purpose, in a further embodiment, it is provided that the control of the electric pad wear readjustment device by energization of the electromagnetic coil during a release movement of the brake feed lever for the purpose of retraction of the electric pad wear readjustment device is performed if a change in the air clearance in the sense of a reduction of the air clearance has been identified.

In a yet further embodiment, the control of the electric pad wear readjustment device by energization of the electromagnetic coil during the brake-application movement of the brake-application device may be performed shortly before a brake feed movement after the air clearance has been passed through, at the start of a brake feed movement after the air clearance has been passed through, upon the release of the brake-application device after the brake feed movement at the end of the release of the brake-application device, or outside the brake feed movement. In this way, an adjustment of the brake pad(s) may be performed as a feed movement, owing to wear, and also as a retraction movement. Thus, the air clearance between brake pad and brake disk can be adjusted. A retraction movement is possible if the clutch device is activated during a backward movement of the brake feed lever.

A further embodiment provides that the energization of the electromagnetic coil is performed by way of at least one short switching pulse. It is also possible for said energization to be performed by way of multiple switching pulses which are for example variable. Thus, the energization of the electromagnetic coil may be performed for example by way of PWM (pulse width modulation).

The electromagnetic coil may also be energized by way of PWM or other suitable actuation regimes such that, for example, an adjustable overload clutch can thereby be formed.

In a further embodiment, it is provided that the disk brake arrangement has the electric pad wear readjustment device with at least one pad wear sensor which may for example be in the form of an angle sensor. The pad wear sensor may also may be the subject of an independent application. It is thus possible for a readjustment process to be performed in targeted fashion in a manner dependent on the wear of brake pads and brake disks by virtue of the clutch device being correspondingly activated and deactivated.

In another embodiment, the at least one pad wear sensor is at least partially a constituent part of the connection device. A particularly compact and simple construction is thus possible.

In another embodiment of the disk brake arrangement, the electric pad wear readjustment device has at least one feed lever sensor, which may also be the subject of an independent application. This, too, may at least partially be a constituent part of a connection device, and may for example also be in the form of an angle sensor. Here, as is likewise provided in the case of the pad wear sensor, a feed sensor element may be arranged in the connection device and interact with a feed encoder element which is coupled to the brake feed lever.

In one embodiment, the control device may be arranged on the electric pad wear readjustment device and thus form a so-called standalone version. In this way, retrofitting of existing series-produced disk brakes is possible because, for example, previous electromechanical potentiometers can be electronically reproduced, wherein terminals for potentiometers provided on a control unit can continue to be used by the reproduced terminals, for example by the control device.

The pad wear readjustment device has a terminal device which is connected in electrically conductive fashion to the at least one electromagnetic coil. The electromagnetic coil is electrically connected by means of a plug connection. In this way, it is possible for the connection device to be easily and quickly changed in the event of maintenance or exchange work, without the need to break or produce special electrical connections by means of tools.

In an alternative embodiment of the disk brake arrangement, the control device may be a constituent part of a controller, for example of a pressure regulating module, and/or brake control unit. A broad area of use is thus realized.

By means of the electric pad wear readjustment device, the electromagnetic clutch can realize not only pad wear readjustment but also pad retraction, for example in the event of a fault or in the event of exchange of the brake pads and maintenance. Thus, air clearance regulation can also be made possible in a simple manner. In this case, the drive source is, as in previous mechanical readjustment devices, the brake feed lever.

The pad wear readjustment device has a terminal device which, in one version, outputs an analog signal of the pad wear sensor and of the feed lever sensor (if used). For this purpose, the terminal device has a control device, for example a microcomputer. The terminal device may however also transmit the sensor signals digitally, without a control device, to a superordinate control unit with corresponding control device.

In the event of a fault of the electric brake (for example absence of a 5 V supply voltage of a potentiometer) being identified, the follow-up movement of the brake pad can be ensured. This is realized by actuation of the electromagnetic coil after identification of the air clearance having been passed through, as long as the brake is still moving in the feed direction, but not during the release of the brake.

The standalone version is compatible with previous designs and is thus exchangeable for retrofitting purposes.

The pad wear readjustment device furthermore has the following advantages:
- autarkic electric pad detection and readjustment
- analog pad wear output
- high possible torque for adjustment by means of toothed clutch
- reliable holding force by means of one, preferably two friction surfaces (ramp-type toothings are also possible instead of friction surfaces)
- simple robust construction
- dedicated supply voltage
- pad wear follow-up movement even during emergency operation of the brake (backup)

The pad wear readjustment device may furthermore have an overload clutch, for example a ball ramp clutch or helical toothing.

A disk brake, in particular for a motor vehicle, having a brake-application device with a brake feed lever and at least one readjustment spindle, has the above-described at least one electric pad wear readjustment device of the above-described disk brake arrangement.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
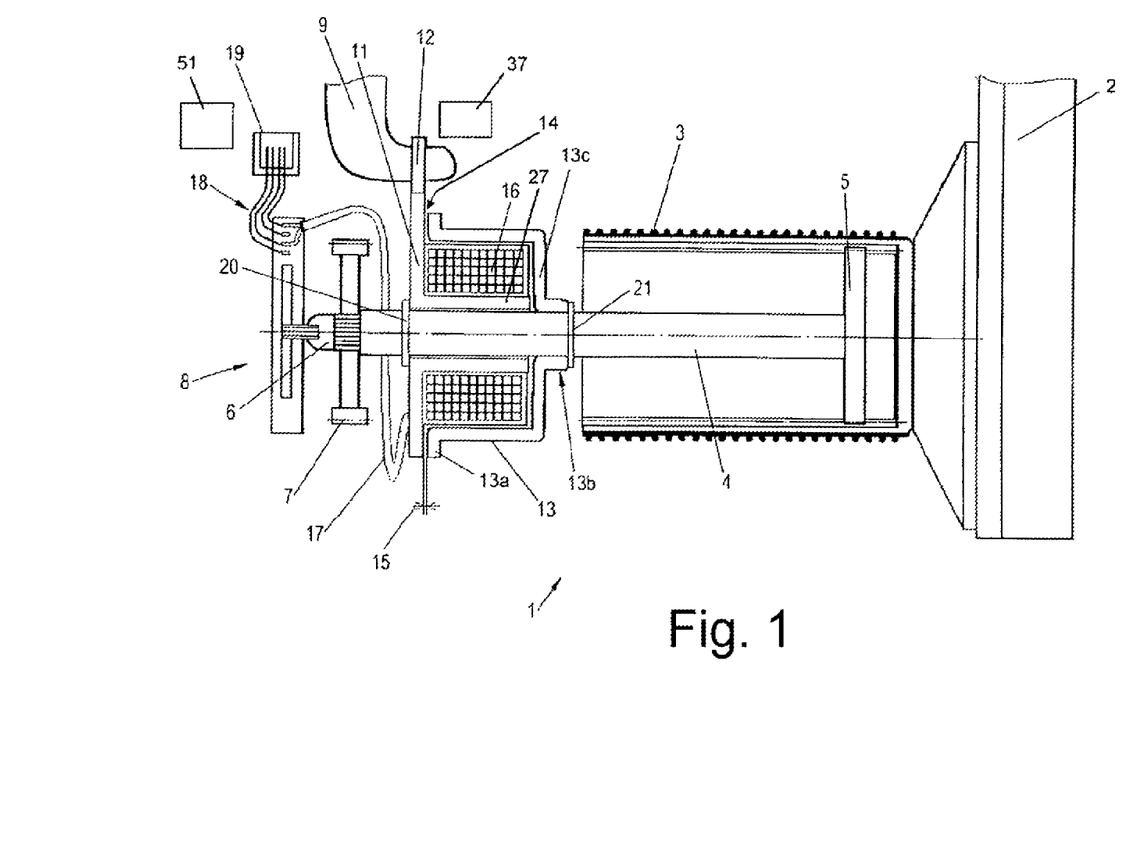
FIG. 1 shows a schematic sectional view of a first exemplary embodiment of a disk brake arrangement according to the invention having a pad wear readjustment device.

FIG. 1 shows a schematic sectional view of a first exemplary embodiment of a disk brake arrangement according to the invention having a pad wear readjustment device 1 in a released position.

The disk brake arrangement in this first exemplary embodiment comprises a disk brake, the pad wear readjustment device 1 and a control device 51.

The disk brake is in this case shown from its brake-application side and has a brake caliper (not illustrated) which engages over a brake disk (likewise not shown). Brake pads 2 are arranged at both sides of the brake disk, of which in this case only the brake application-side brake pad 2 is shown, together with a readjustment spindle 3 of the pad wear readjustment device 1, to which the brake pad 2 is connected. The other brake pad is fixed in the brake caliper. The brake caliper may for example be a sliding caliper. A brake feed lever 9 for the brake-application action of the disk brake is indicated. The readjustment spindle 3 is provided with an external thread and is screwed into a pressure plunger (not shown) which interacts with the brake feed lever 9. The disk brake may have more than one pressure plunger with respective readjustment spindle 3.

The readjustment spindle 3 of the pad wear readjustment device 1 is furthermore equipped with an internal thread which meshes with an output gear 5 of a readjustment shaft 4. The output gear 5 is in this case attached rotationally conjointly to an end of the readjustment shaft 4 which points toward the brake pad 2.

A spacing between the brake pad 2 or the brake pads 2 and the brake disk is referred to as air clearance. During a braking process, when the brake is actuated, the air clearance is firstly passed through by virtue of the brake pad 2 being adjusted toward the brake disk of the brake. The air clearance is also assigned a lever feed travel h (see FIGS. 5-10) of the brake feed lever 9. The air clearance is increased owing to the wear of the brake pad 2 and of the brake disk. The pad wear readjustment device 1 serves for the adjustment of the air clearance to a presettable normal value. In this case, the expression "adjustment" is to be understood to encompass both a feed movement in the direction toward the brake disk for the purpose of reducing the air clearance and a retraction movement away from the brake disk for the purpose of increasing the air clearance.

The expression "friction point" is the point at which the brake pad 2 bears against the brake disk of the disk brake. The friction point is reached, during the brake-application process, after the so-called air clearance has been passed through. Further brake-application movement then effects a braking process or braking operation by virtue of the brake pad 2 being pressed against the brake disk. A release of the brake-application device effects a reversal of the above-described process. This will be explained in detail in conjunction with FIGS. 5 to 10.

In this first exemplary embodiment, the other end of the readjustment shaft 4 is, as transmission end 6, equipped with a transmission gear 7 and coupled to a pad wear sensor 8. The transmission gear 7 is for example in the form of a chain sprocket and coupled via a chain 25 (see FIG. 3) to a further readjustment spindle (not shown). In this embodiment, the pad wear sensor 8 has for example a potentiometer with or without a gearing. The potentiometer may also be a multi-turn potentiometer and is electrically connected to a connecting element 19 via a connecting line 18. The connecting element 19 serves for electrical connection to the control device 51 via a line (not illustrated). The control device 51 may for example be arranged in a brake control unit or in some other control unit. The connecting element may for example be in the form of a multi-pole, for example five-pole, angle plug. An electrical resistance of the multi-turn potentiometer can be varied by way of a rotational angle of the readjustment shaft 4 coupled thereto, and is proportional to the pad wear of the brake pad 2 or of the brake pads of the disk brake.

The pad wear readjustment device 1 is in the form of an electric pad wear readjustment device 1. For this purpose, in the section adjoining the transmission end 6, the readjustment shaft 4 is coupled to an electrically switchable clutch device 10. The clutch device 10 is in the form of an electromagnetic clutch and has a rotary drive element 11 with a gear mesh 12, a clutch cover 13 and an electromagnetic coil 16. The rotary drive element 11 with the gear mesh 12 is attached to the input side of the clutch device 10, wherein the gear mesh 12 interacts with the brake feed lever 9. The gear mesh 12 is formed radially remote from the readjustment shaft 4 on a disk of the rotary drive element 11. Said disk is connected rotationally conjointly to a coil carrier 27, which in this case is a tubular section. The coil carrier 27 bears the annular electromagnetic coil 16 and is axially displaceable on the readjustment shaft 4. The axial displaceability of the rotary drive element 11 and of the coil carrier 27, which in this exemplary embodiment is connected thereto, is restricted by axial stops 20, 21 on the readjustment shaft 4. The electromagnetic coil 16 is electrically connected to the connecting line 18 via a line 17, and is thus connected to the connecting element 19 and, via the latter, to the control device 51.

The annular electromagnetic coil 16 on the coil carrier 27 is surrounded by the clutch cover 13 in the manner of a hood. The clutch cover 13 is, at its side pointing toward the disk of the rotary drive element 11, equipped with a flange-like clutch region 13a and, in the release position shown here in FIG. 1, is spaced apart, by a clutch gap 15, from a region that corresponds with said clutch region. Said clutch region 13a and that region of the rotary drive element 11 which corresponds with said clutch region form a clutch section 14. Said regions of the clutch section 14 may for example be formed with special friction layers or friction linings.

The clutch cover 13 extends from the clutch region 13a parallel to the readjustment shaft 4 to the side pointing toward the brake pad 2, on which the clutch cover 13 is closed off in the radial direction by a wall section 13c as far as a central flange-like connecting section 13b. The flange-like connecting section 13b is connected rotationally conjointly to the readjustment shaft 4 and is additionally fixed axially by way of the axial stop 21.

The pad wear readjustment device 1 is furthermore equipped with a feed lever sensor 37 which will be explained in more detail below. The feed lever sensor 37 detects a movement, in this case a pivoting movement, of the brake feed lever 9.

The movement of the brake feed lever 9 during the brake-application or release movement of the disk brake is utilized to rotate the readjustment spindle 3 for the purpose of adjusting, that is to say readjusting or retracting, the brake pad 2. If an adjustment of the brake pad 2 is to be performed, the electromagnetic coil 16 is activated, that is to say supplied with current via the line 17. The electromagnetic action thus generated gives rise to magnetic force lines which run through the rotary drive element 11, the clutch cover 13 and also, in part, through the readjustment shaft 4. The axially displaceable rotary drive element 11 is in this case coupled together on the readjustment shaft 4 with the flange-like clutch region 13a of the clutch cover 13 by way of the associated clutch elements, for example friction surfaces or friction pads. Here, the clutch gap 15 is closed, as is easily conceivable. The electromagnetic coil 16 which is attached to the coil carrier 27 which is fixedly connected to the rotary drive element 11, likewise pivots with the pivoting movement of the rotary drive element 11. In this case, the line 17 is of flexible form, for example in the form of stranded wires or a flexible conductor foil.

During a brake-application movement of the brake feed lever 9, it is then the case that, by way of the gear mesh 12, the rotary drive element 11 is pivoted and, via the activated, that is to say electrically switched-on clutch device 10, a torque is transmitted via the clutch section 14 to the clutch cover 13 and to the readjustment shaft 4. By means of such a rotation of the readjustment shaft 4, the readjustment spindle 3 is likewise rotated by way of the output gear 5, and causes, by way of its external thread in the pressure plunger, an axial adjustment of the brake pad 2 toward the brake disk for the purpose of compensating wear of the brake pad 2. When the brake feed lever 9 moves back into its initial position during the release movement, the electromagnetic coil 16 is deactivated, that is to say no longer supplied with current, beforehand such that no further transmission of torque from the brake feed lever 9 to the readjustment shaft 4 takes place.

The transmission of torque by the clutch device 10 is configured such that, in the absence of pad wear, that is to say when the brake pad 2 is not to be readjusted, the clutch device 10 can slip.

Furthermore, instead of a readjustment movement, the clutch device 10 may also be activated only during the retraction movement of the brake feed lever 9, whereby a retraction of the brake pad 2 is possible.

The activation of the clutch device 10 may be performed on the basis of various criteria such as, for example, after a settable number of brake-application processes and wherein pad wear has been measured by means of the pad wear sensor 8. An activation of the clutch device 10 for the purpose of retracting the brake pad 2 may be performed for example in the event of a fault and for brake pad exchange purposes, and by way of actuation of the brake feed lever 9. It is furthermore possible for the pad wear readjustment device 1 to be retracted by activation of the clutch device 10 when the brake pad 2 bears and grinds against the brake disk in the absence of brake-application action. This may in turn be identified by way of various criteria, such as for example by way of temperature sensors at suitable locations in the vicinity of the brake pad 2 or of the carrier thereof.

Figure 2:
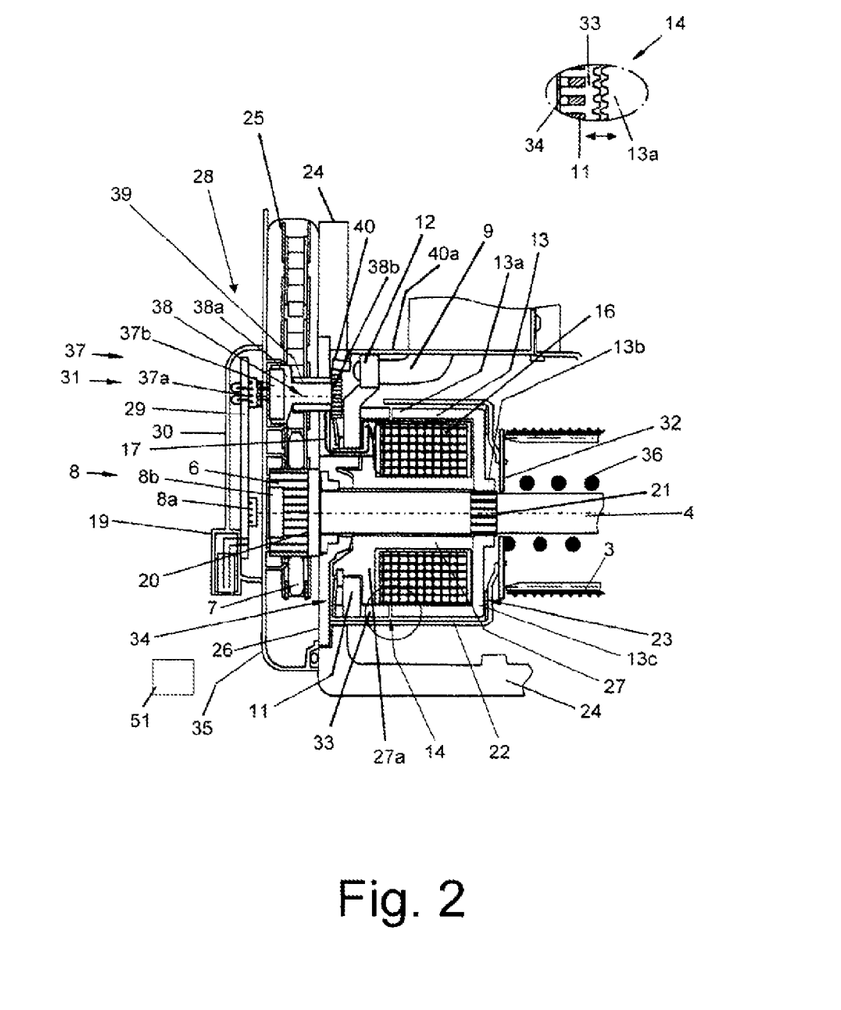
FIG. 2 shows a schematic sectional view of a second exemplary embodiment of the disk brake arrangement according to the invention.

FIG. 2 illustrates a schematic sectional view of a second exemplary embodiment of the disk brake arrangement according to the invention.

In this case, the clutch device 10 is likewise in the form of an electromagnetic clutch and has the rotary drive element 11, the clutch cover 13, the clutch section 14 and the electromagnetic coil 16. By contrast to the first exemplary embodiment, the rotary drive element 11 is coupled to a clutch element 33 which can be engaged with the clutch cover 13 by way of the clutch section 14.

By contrast to the first exemplary embodiment, the electromagnetic coil 16 is mounted fixedly on the coil carrier 27. In this case, the coil carrier 27 is a tubular section which is coupled in a manner explained in more detail below to a static outer bearing 26, and which, in the activated state, in the event of pivoting movements of the rotary drive element 11, does not perform pivoting movements in conjunction therewith.

The outer bearing 26 is, by way of its section in the form of a disk and pointing toward the transmission end 6 of the readjustment shaft 4, mounted in a rotationally fixed manner in a brake housing 24 of the disk brake, which is not illustrated in any more detail. Said disk of the outer bearing 26 may for example be produced from a plastics material. The outer bearing 26 thus forms a bearing arrangement for the readjustment shaft 4 in the brake housing 24.

Pointing toward the outer bearing 26, the coil carrier 27 has a disk section 27a with a share receptacle which is spherical in the center and which corresponds with a corresponding spherical projection of the disk of the outer bearing 26, accommodates said spherical projection and, by means thereof, interacts with the outer bearing. The outer bearing 26 is furthermore equipped with a twist prevention means for the line 17 of the coil connection wires of the electromagnetic coil 16. Thus, angular movements of the pad wear readjustment device 1 during actuation can be compensated. The line 17 is fixed to a coil body of the electromagnetic coil 16 only at the outlet to the plug connection 31, such that said line can compensate the angular movements (approximately ±0.5°) by flexing.

The rotary drive element 11 with the gear mesh 12 is mounted on the input side of the clutch device 10, wherein the gear mesh 12 interacts with the brake feed lever 9. The gear mesh 12 is formed radially remote from the readjustment shaft 4 on the disk of the rotary drive element 11.

In this second exemplary embodiment, the clutch cover 13 also extends from the clutch region 13a parallel to the readjustment shaft 4 to the side pointing toward the brake pad 2, and is closed off by the wall section 13c in the radial direction as far as the central flange-like connecting section 13b. The flange-like connecting section 13b is, in this case too, connected rotationally conjointly to the readjustment shaft 4.

A stop delimiting element 22 is formed as a pot-shaped cover of the clutch device 10 and is provided, in the region of the brake feed lever 9, with a cutout. An additional friction surface, which is formed for example as a separate friction disk or machined surface of the wall section 13c or of the opposite inner side of the stop delimiting element 22, for inherent twist prevention is made possible by a friction section 23 which interacts with the clutch cover 13, that is to say with the edge region of the wall section 13c, which in this case is closed. The stop delimiting element 22 is coupled, in the direction of the readjustment spindle 3, to a thrust washer 32, which in turn interacts with a brake-application spring 36 and covers the readjustment spindle 4 at the face side. The brake-application spring 36 presses, via the thrust washer 32, by way of the inner side of the wall section 13c against the friction section 23.

FIG. 2 also shows a chain 25 which, as a torque transmission element, connects the transmission gear 7 to another transmission gear of a further readjustment shaft (not shown).

The chain 25 is covered by means of a cover 35, which is connected to the brake housing 24 in a manner not illustrated in any more detail. A terminal device 28 is arranged on said cover 35 in the region of the transmission end 6 of the readjustment shaft 4.

The terminal device 28 comprises the connecting element 19, a printed circuit board 29, the plug connection 31 and the pad wear sensor 8. The connecting lines 18 (see FIG. 1) are in this case in the form of conductor tracks of the printed circuit board 29 and connect, on one side, the plug connection 31 and a wear sensor element 8a to the connecting element 19.

The connecting element 19 may be in the form of an angle plug, for example. The plug connection 31 forms a plug-in connection between the printed circuit board 29 and the line 17, in a manner not shown in any more detail.

At that side of the printed circuit board 29 which points toward the brake pad 2, the face side of the transmission end 6 of the readjustment shaft 4 is arranged opposite the wear sensor element 8a, for example a Hall sensor element, which interacts with a wear encoder element 8b, for example a permanent magnet which is positioned in the transmission end 6 of the readjustment shaft 4, as an angle sensor. The wear sensor element 8a is also electrically connected to the terminal contacts of the connecting element 19, such that, for example, one plug connector can be used for the transmission of both the electrical power for the electromagnetic coil 16 and the electrical signals of the pad wear sensor 8.

The wear sensor element 8a generates, in a manner dependent on the angular position of the wear encoder element 8b, an electrical signal (analog or digital) which is proportional to the angular position and which is evaluated in an associated evaluation circuit and which is used further as a measure for the wear of the brake pad 2 and of the brake disk of the disk brake. This will be described in more detail below.

The connection device 28 is arranged in a housing 30 and is protected against external influences (ingress of dust and moisture, IP protection) and access. The housing 30 is plugged onto the cover 35 of the chain 25 in modular fashion and is fastened for example by means of commonly utilized screws. In another embodiment which is not illustrated but is conceivable, the connection device 28 may for example be connected to the outer bearing 26.

The feed lever sensor 37 comprises a feed sensor element 37a, a feed encoder element 37b and a carrier shaft 38. The feed sensor element 37a may for example be, like the wear sensor element 8a, a Hall sensor element, and is arranged on that side of the printed circuit board 29 of the connection device 28 which points toward the brake pad 2. The feed lever sensor 37 is in this case constructed similarly to the pad wear sensor 8, wherein the feed sensor element 37a interacts with the feed encoder element 37b as angle sensor. The feed encoder element 37b is for example also a permanent magnet which is arranged in a carrier section 38a at a thickened end of the carrier shaft 38. That section of the carrier shaft 38 which extends from there toward the brake pad 2 has a smaller diameter than the carrier section 38a and is received in rotatable fashion in a bearing 39, for example a brass or plastics bushing, in an end section of the disk of the outer bearing 26.

The carrier shaft 38 extends parallel to the axis of the readjustment shaft 4 to a point over a flange section 11a of the rotary drive element 11. In an alternative embodiment, an axis of rotation of the carrier shaft 38 intersects an axis of rotation of the bearing of the brake feed lever 9. This permits optimum functioning of the angular gear, that is to say the angular gear operates substantially without wear.

In this variant, the drive of the carrier shaft 38 of the feed lever sensor 37 is formed with a toothed segment holder 40a for a toothed segment 40. In this case, the toothed segment holder 40a is mounted directly on the brake feed lever 9. In this case, the toothed segment 40 engages, on that side of the carrier shaft 38 which faces away from the readjustment shaft 4, with the carrier toothing 38b. The toothed segment holder 40a may for example be a punched and bent sheet-metal part. In this case, the toothed segment holder may exhibit a certain degree of elasticity for axial play compensation. The toothed segment 40 is arranged obliquely, whereby angular errors can be minimized.

During a pivoting movement of the brake feed lever 9, the rotary drive element 11 and likewise the toothed segment 40 pivot. In this case, by way of the intermeshing toothings of the toothed segment 40 and of the carrier toothing 38b, the carrier shaft 38, and at the same time the feed encoder element 37b of the feed lever sensor 37, are pivoted. In this way, a pivoting movement of the brake feed lever 9 is detected by the feed lever sensor 37 and transmitted as an electrical analog and/or digital signal via the printed circuit board 29 to the connecting element 19 for further use, as will be explained in more detail below. The connecting element 19 can thus be used for transmitting the electrical power for the electromagnetic coil 16 and also the electrical signals of the pad wear sensor 8 and of the feed lever sensor 37.

The rotary drive element 11 is mounted pivotably on a shoulder of the disk section 27a. The rotary drive element 11 is fixed axially in the direction of the transmission end 6 of the readjustment shaft 4, for example by way of a shaft securing ring, that is to say the rotary drive element 11 is axially non-displaceable. In the opposite direction, that is to say in the direction of the clutch cover 13, the rotary drive element 11 is coupled rotationally conjointly to the clutch element 33, which is situated at the level of the clutch cover 13 of the clutch device 10 and is axially displaceable. The clutch cover 13 extends parallel to the axis of the readjustment shaft 4. The clutch section 14 formed from the clutch element 33 and the clutch region 13a is in the form of a toothed clutch with oblique angle. The toothing is illustrated in the enlarged detail illustration at the top right in FIG. 2. On the side pointing toward the brake pad 2, the clutch element 33 has the clutch teeth of the clutch section 14. The clutch teeth interact with corresponding clutch teeth of the clutch region 13a of the clutch cover 13. On that side of the clutch element 33 which is situated opposite the clutch teeth, projections of the clutch element 33 extend through the rotary drive element 11. The ends of said projections of the clutch element 33 are furthermore in contact, on the side pointing toward the transmission end 6 of the readjustment shaft 4, with a retraction spring 34, for example an encircling resilient sheet-metal ring. The retraction spring 34 serves for retracting the clutch device 10 into the released position shown in FIG. 2. In the released position, the clutch teeth of the clutch section 14 are out of engagement. In other words, when the electromagnetic coil 16 is energized, the clutch element 33 is displaced axially in the direction of the brake pad 2 (double arrow), and the clutch teeth of the clutch element 33 engage with the clutch teeth of the clutch cover 13. By means of the rotationally conjoint connection (projections of the clutch element 33), the clutch element 33 remains also in engagement with the rotary drive element 11, and can in this way transmit the pivoting movement of the rotary drive element 11 to the clutch cover 13 and thus to the readjustment shaft 4.

In this second exemplary embodiment, the electromagnetic coil 16 can be designed to be smaller than in the preceding exemplary embodiment, because said electromagnetic coil need merely impart the electromagnetic force for the engagement of the clutch section 14, specifically for bringing the toothings into engagement. In the case of said engagement, there is no need for any friction linings to be pressed against one another with a certain normal force for the purpose of transmitting a torque. The torque is transmitted in positively locking fashion by way of the intermeshing teeth.

The oblique angle of the clutch teeth of the clutch section 14 in the form of the toothed clutch is configured such that, in an overload situation, the clutch teeth of the clutch section 14 disengage. Said oblique angle may for example lie in the range of 20°. The transitions of the flanks of the clutch teeth to the tooth tips of the clutch teeth may be rounded in order to permit a smooth engagement.

By means of adaptation of the magnetic field strength of the electromagnetic coil 16, for example by means of PWM (pulse width modulation) actuation, the overload point can be varied. It is furthermore possible by means of the PWM actuation to determine the holding friction, together with friction force, of the readjustment spindle 3. Thus, the overload torque can be detected precisely by means of corrected PWM actuation.

To eliminate disruptive influences of the obliquely introduced feed force of the brake feed lever 9 owing to an axis height offset between the bearing arrangement of the brake feed lever 9 and of the pad wear readjustment device 1, the rotary drive element 11 may be connected by way of a perpendicular toothing in rotating fashion by means of an intermediate element. In this way, the torque from the overload can be determined more precisely.

Furthermore, the control device 51 of the disk brake arrangement is illustrated, which, in a manner explained in more detail below, is connected to the pad wear sensor 8, to the feed lever sensor 37 and to the electromagnetic coil 16.

Figure 3:
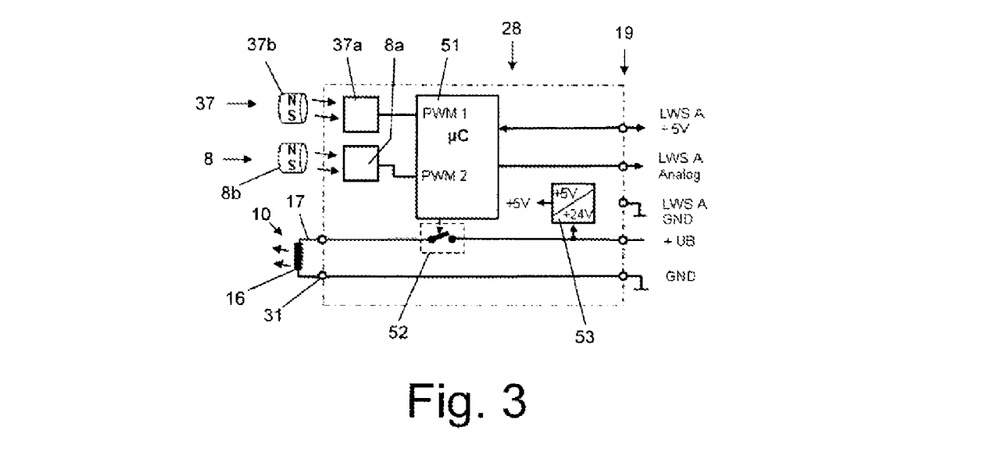
FIG. 3 shows a schematic block circuit diagram of the first exemplary embodiment as per FIG. 1.

FIG. 3 shows a schematic block circuit diagram of the first exemplary embodiment as per FIG. 1 in the form of a so-called standalone version.

The connection device 28 is arranged on the disk brake and has the connecting element 19 in the form of a five-pole plug connector. The pad wear sensor 8 is shown with the wear sensor element 8a, for example a Hall sensor element, and the wear encoder element 8b, for example a permanent magnet with north pole N and south pole S.

At the disk brake (indicated by the dash-dotted box), the control device 51, for example in the form of a microcomputer, is arranged on the printed circuit board 29 in the connection device 28. The pad wear sensor element 8a, the feed sensor element 37a and a clutch switch 52, for example a semiconductor switch or a relay, are likewise mounted on the printed circuit board 29 and connected to the control device 51. Furthermore, the encoder elements 8b and 37b are schematically illustrated as permanent magnets with action arrows. The electromagnetic coil 16 of the clutch device 10 is connected via the line 17 to the plug connection 31. The connecting element 19 comprises the terminals for a 5 V voltage supply (LWS A +5V), ground of the sensors (LWS A GND), signal output of the sensors (LWS A), in this case analog (a digital output is self-evidently also possible), voltage supply (+UB) of the electromagnetic coil 16 (for example 24 V), and the ground (GND) thereof. In this exemplary embodiment, an additional voltage regulator 53 is provided which outputs a regulated 5 V voltage from the voltage supply (+UB) of the electromagnetic coil 16.

This embodiment may also be designed to reproduce a potentiometer and be fully backward compatible. It may be implemented as a standalone version and with automatic detection of a pressure regulating module (DRM) and corresponding digital output.

Figure 4:
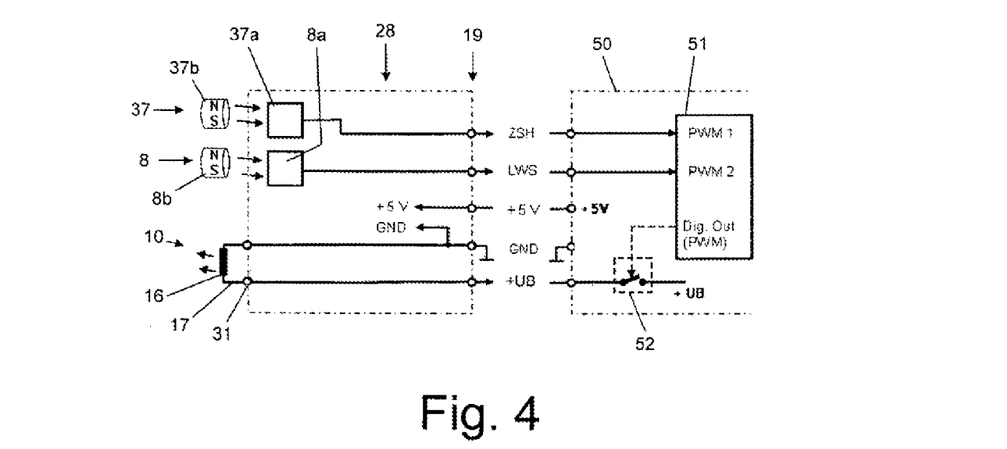
FIG. 4 shows a schematic block circuit diagram of the second exemplary embodiment as per FIG. 3.

FIG. 4 illustrates a schematic block circuit diagram of the second exemplary embodiment as per FIG. 3. By contrast to FIG. 3, this is not a standalone version. It is however self-evidently possible for each exemplary embodiment to be combined with each circuit, that is to say as per FIG. 3 or FIG. 4.

In the embodiment of FIG. 4, a so-called integrated solution is illustrated in which the evaluation circuit, that is to say the control device 51, is a constituent part of a controller 50, for example of a pressure regulating module and/or brake control unit. Therefore, no control device 51 is required on the printed circuit board 29 of the terminal device 28. The printed circuit board 29 is equipped with the connecting element 19, the plug connection 31, the pad wear sensor element 8a and the feed sensor element 37a. The terminal assignment of the connecting element 19 has a common ground (GND), the voltage supply +5V for the sensor elements 8a and 37a, the voltage supply (+UB) for the electromagnetic coil 16 and the signal outputs LWS as angle sensor signal of the pad wear sensor 8 and ZSH as angle sensor signal of the feed lever sensor 37.

The connecting element 19 connected with a multi-strand cable with the controller 50. The controller 50 outputs the supply voltage +5V, or another or multiple suitable voltage(s), and provides the ground terminal for the sensor elements 8a and 37a and the supply voltage +UB (with ground terminal GND) for the electromagnetic coil 16 of the clutch device 10. The controller 50 has the control device 51, for example a microcomputer, for processing the signal of the wear sensor element 8a and of the feed sensor element 37a. The wear sensor element 8a is connected via the terminal PWM2 to the control device 51, and the feed sensor element 37a connects to the terminal PWM1 of the control device 71. Furthermore, the control device 51 is provided for controlling a clutch switch 52 via an output Dig.OUT (PWM). The clutch switch 52 serves for activating the electromagnetic coil 16 by connecting the latter to the supply voltage +UB. The clutch switch 52 may for example be a relay and/or a semiconductor switch, or may be composed of several of these or of a combination of these.

The pad wear sensor 8 detects a wear travel by way of the described angle sensor means over multiple revolutions of the readjustment shaft 4. The wear sensor element 8a outputs the detected travel and/or the detected angle as an analog signal and/or as a digital signal, for example PWM signal, with a resolution of, for example, 12 bit. Said signal is processed by the control device 51 by means of evaluation software such that the pad wear of the disk brake is available as an electrical signal or value which can be processed further.

Figure 5:
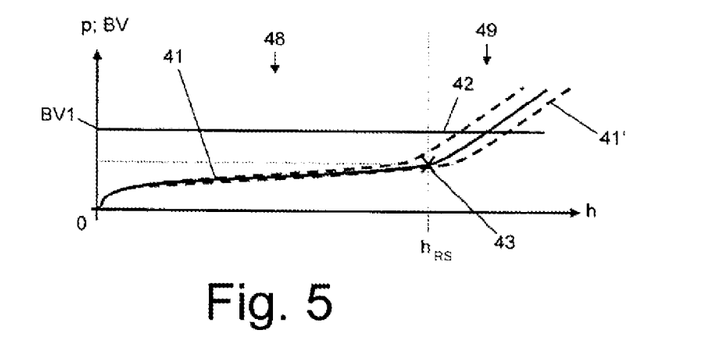
FIGS. 5-6 show schematic diagrams regarding the detection of an air clearance.
Figure 6:
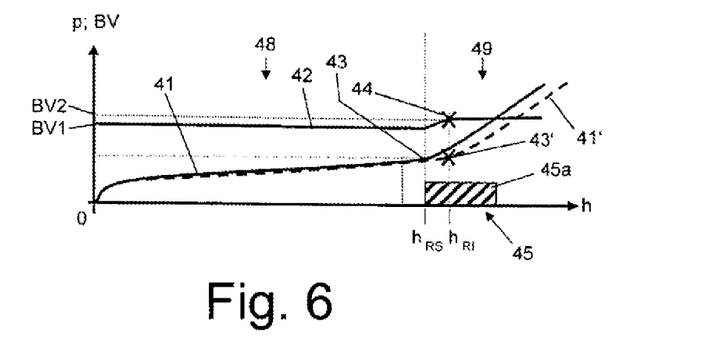

FIGS. 5 and 6 show schematic diagrams regarding the detection of an air clearance of a brake. Here, a pressure p of the brake-application device of the brake and a pad wear BV are plotted on an ordinate versus a lever feed travel h (abscissa). The pressure p may also be the air pressure of a pneumatic disk brake. The lever feed travel h is to be understood to mean a travel of the brake feed lever 9. The passage through the air clearance is indicated as a region 48 which extends from the zero point of the lever feed travel h to a setpoint friction point $h_{RS}$. From the setpoint friction point $h_{RS}$ toward higher h values, there follows a further region 49 which is referred to as brake feed movement and in which a braking process takes place after the air clearance 48 has been passed through.

An actuation of the brake-application device thus encompasses a brake-application movement and a release movement. The brake-application movement is the passage through the air clearance 48 to the friction point 43, 43', 43"

and the brake feed movement 49. The release is the reverse process. An actuation of the brake-application device outside a braking operation, or outside the brake feed movement 49, involves only the region of the passage through the air clearance 48, and thus both brake-application movement and release movement.

FIG. 5 shows the situation in which a present friction point corresponds to a setpoint friction point $h_{RS}$. By contrast, FIG. 6 illustrates the situation in which the present friction point does not correspond to the setpoint friction point $h_{RS}$.

The pad wear BV is detected by the pad wear sensor 8, and the feed lever sensor 37 determines the lever feed travel h of the brake feed lever 9.

In FIG. 5, a brake pressure 41 is plotted as a solid curve, and a brake pressure 41' which will be discussed in FIG. 6 is indicated by a further dashed profile. During the brake-application movement, the brake pressure 41 increases, in the range of passage through the air clearance 48, with a relatively low gradient from the zero point of the lever feed travel h to the setpoint friction point $h_{RS}$. In said range, the air clearance is passed through. The air clearance thus corresponds to the lever feed travel from the zero point to the setpoint friction point $h_{RS}$.

In this example, no readjustment is performed by means of the pad wear readjustment device 1. This is the case when, for example, the brake pads 2 are new or a readjustment has been performed during a preceding braking process. Thus, the pad wear BV, with a value BV1 indicated on the ordinate, is a constant pad wear sensor value 42 of the pad wear sensor 8. Said pad wear BV1 has been detected as a preset value during a pad change or as an electrical signal by means of the pad wear sensor 8 during a preceding braking process, and then stored in a memory device of the control device 51. Thus, the pad wear BV 1 is available as a temporary reference value.

The value of the lever feed travel h of the setpoint friction point $h_{RS}$ has likewise been preset in accordance with the type of brake and brake pads 2 and stored in or by means of the control device 51.

At a friction point 43, the curve of the brake pressure 41 intersects a line parallel to the ordinate and running through the setpoint friction point $h_{RS}$. When the friction point 43 is reached, the brake pressure 41 increases greatly in the range of brake feed movement 49, because the brake pads 2 now bear against the brake disk, and a braking operation takes place.

In FIG. 6, it is shown that the air clearance has become greater owing to wear of the brake pads 2 as a result of preceding braking processes. That is to say, a present friction point has shifted toward a higher value of the lever feed travel h. Said present friction point is in this case indicated as actual friction point $h_{RI}$ and no longer coincides with the setpoint friction point $h_{RS}$.

The dashed curve of the brake pressure 41' represents a profile encountered after a number of braking processes with associated wear of brake pads 2. The brake pressure 41' increases in FIG. 6 with a slightly shallower gradient than in FIG. 5 in the region of passage through the air clearance 48, and runs to a present friction point 43', at which the curve of the brake pressure 41' intersects the line parallel to the ordinate and running through the value designated actual friction point $h_{RI}$. The curve profile obtained in the absence of prior readjustment is defined by the relatively long travel h, that is to say by the difference actual friction point $h_{RI}$-setpoint friction point $h_{RS}$.

Said present actual friction point $h_{RI}$ is assigned a pad wear BV2 (intersection point 44). The difference pad wear BV2-pad wear BV1 is referred to as wear dimension.

To compensate this wear dimension by readjustment, that is to say to adjust the air clearance back to the original value (in a settable tolerance range), and thus obtain the profile of the curve of the brake pressure 41 as per FIG. 5, it is now firstly detected by means of the pad wear readjustment device 1, with the pad wear sensor 8 and a sensing means of the brake feed lever 9, that is to say with the feed lever sensor 37, whether the actual friction point $h_{RI}$ corresponds to the setpoint friction point $h_{RS}$ (with a certain presettable tolerance) or has shifted toward greater lever feed travels h as a result of wear.

In this case, the clutch device 10 is activated during every braking process or after a presettable number of braking processes. The activation begins after the air clearance has been passed through, for example when the value of the lever feed travel h detected by the feed lever sensor 37 has reached the h value of the setpoint friction point $h_{RS}$, or shortly before this. This will be explained in more detail below. It is self-evidently possible for said beginning to be fixedly preset in a control program in the control device or else calculated by means of suitable algorithms, for example from a history of previous braking processes. For the readjustment of the pad wear, it is also possible for mean value deviations from preset setpoint values (h, BV) to be taken into consideration.

Since the actual friction point $h_{RI}$ has shifted from the setpoint friction point $h_{RS}$ toward higher h values as a result of wear during the preceding braking processes, the pad wear BV detected by the pad wear sensor 8 will increase from the previously stored pad wear BV1 until the present actual friction point $h_{RI}$ with the associated pad wear BV2 is reached. At the actual friction point $h_{RI}$, no further pad wear readjustment can take place, that is to say the pad wear BV2 detected by the pad where sensor 8 no longer changes. The activation of the clutch device 10 is subsequently ended, as will be explained below.

A shift of the present actual friction point $h_{RI}$ can furthermore be determined by means of the feed lever sensor 37. For this purpose, the value of the lever feed travel h detected in each case by the feed lever sensor 37 is compared with the stored h value of the setpoint friction point $h_{RS}$. If the detected value of the lever feed travel h exceeds the h value of the setpoint friction point $h_{RS}$, then the friction point has shifted.

The activation of the clutch device 10 takes place, as illustrated in FIG. 6, during electromagnetic clutch operation 45 indicated, as air clearance reduction operation 45a, by a rectangle with hatching running upward and to the right. That is to say, the lever feed travel h passed through by the brake feed lever 9 during the brake feed movement 49 (or also already partially prior to that during the passage through the air clearance 48) is utilized to perform the wear readjustment. The electromagnetic clutch operation 45, as air clearance reduction operation 45a, is activated at the setpoint friction point $h_{RS}$ or shortly prior to that. In this case, the control device 51 (see FIGS. 3 and 4) activates the clutch switch 52, whereby the electromagnetic coil 16 is supplied with current for the purpose of activating the clutch device 10. In this case, the movement of the brake feed lever 9 is transmitted to the readjustment shaft 4 of the pad wear readjustment device 1 by the clutch device 10. When the actual friction point $h_{RI}$ has been reached, the readjustment is ended. The wear dimension, or the pad wear BV2, has been reached. The activation of the clutch device 10 may be maintained, for example with a certain excess dimension h or a time delay, because the toothing of the clutch section 14 disengages when blocked. In other words, when the present friction point 43' has been reached, a readjustment is no longer possible and the pad wear readjustment device 2 is blocked. In this case, the clutch section 14 can disengage and/or or one or more overload devices may be activated. Alternatively, the electromagnetic clutch operation 45 may be ended again during or before the retraction movement of the brake feed lever 9. The movement of the brake feed lever 9 can be detected entirely by means of the feed lever sensor 37.

It is however also possible that, with simultaneous monitoring of the pad wear sensor 8 and detection of the lever feed travel h by the feed lever sensor, the present friction point can be detected by way of the force transmitted by the readjustment spindle 4. This is achieved for example in that, when a feed movement of the brake feed lever 9 is sensed, no further adjustment is detected by means of the pad wear sensor 8, which is the case at intersection point 44 (FIG. 6).

In this way, the present friction point can also be determined at any time. For this purpose, passage through the air clearance 48 is necessary, but a brake feed movement 49 is not.

Furthermore, it is possible that, if an exceedance of the setpoint friction point $h_{RS}$ is detected by the feed lever sensor 37 the electromagnetic coil 16 is activated by the control device 51 by means of the clutch switch 52 during the subsequent brake-application process, that is to say feed movement of the brake feed lever 9, and is deactivated again during the retraction movement of the brake feed lever 9. For this purpose, the control device 51 receives and/or monitors an activation and deactivation signal for example from the brake control unit.

Said readjustment takes place during the subsequent braking process by energization of the electromagnetic coil 16 of the clutch device 10 shortly before the beginning of a brake feed movement 49 by the brake feed lever 9, shortly before the setpoint friction point $h_{RS}$. It is self-evidently also possible for the clutch device 10 to be activated and deactivated at any time during the time profile of the feed movement, that is to say in ranges 48 and 49.

In this way, it is possible to attain effective pad wear readjustment by brief energization of the electromagnetic clutch 16 of the clutch device 10 over only a short section of the lever feed travel h. The torque required for the actuation of the pad wear readjustment device 1, which torque is extracted from the brake feed energy at the brake feed lever 9, is thus restricted to a time segment of the short time period of the electromagnetic clutch operation 45 until the clutch section 14 disengages, which results in an energy saving.

Figure 7:
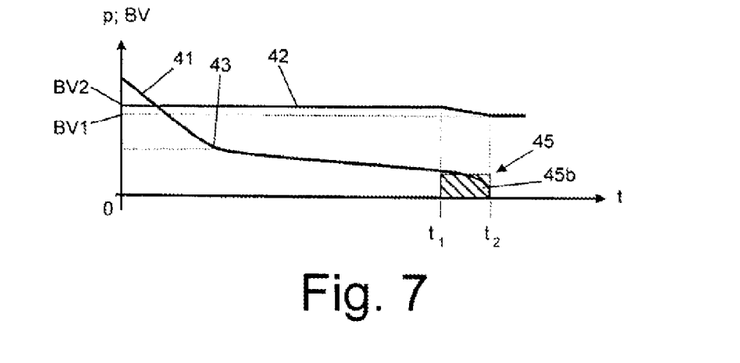
FIG. 7 shows a schematic diagram regarding the increase of an air clearance.

FIG. 7 shows a schematic diagram regarding the increase of the air clearance, wherein a pressure p of the brake-application device of the brake and a pad wear BV are plotted on an ordinate—by contrast to FIGS. 5 and 6—versus a time t (abscissa).

At the time t=0, the brake is still applied, and the brake pressure 41 is at a high value. The pad wear value BV2 is detected as pad wear sensor value 42.

Upon the release of the brake, the brake feed lever 9 moves back and the brake pressure 41 decreases over time t, until the friction point (which is evident at the bend in the curve from a steep gradient to a shallower gradient) is reached.

In the case illustrated here, the brake pad 2 bears and grinds against the brake disk in the absence of a brake-application action. This may be detected for example by means of temperature sensors at suitable locations in the vicinity of the brake pad 2 or of the carrier thereof.

It is now possible for the pad wear readjustment device 1 to be reset, for example to the pad wear value BV1, by energization of the electromagnetic coil 16 of the clutch device 10 during the retraction movement or resetting or release movement of the brake feed lever 9. In this case, this takes place shortly before the end of the retraction movement of the brake feed lever 9 in further electromagnetic clutch operation 45, as air clearance increase operation 45b (illustrated with hatching running upward and to the left), which begins at a time t1 and ends at a time t2. At the time t1, the readjustment shaft 4 of the pad wear readjustment device 1 is rotated backward, wherein the pad wear sensor 8 detects the change of BV2 to lower values. When the pad wear BV1 is reached, the electromagnetic clutch operation 45 is ended again at the associated time t2.

It is thus furthermore possible, by activation of the electromagnetic clutch 16 of the clutch device 10 over sections of the lever feed travel h during the application and release of the brake, to achieve regulation of the air clearance by readjustment and retraction.

The detection of an excessively small air clearance or of a grinding brake pad 2 will not be explained in any more detail here and may be implemented in a variety of ways, wherein the adjustment of the air clearance is made possible by means of the above processes.

The retraction as shown in FIG. 7 may self-evidently also be performed at a different time t during the lever feed travel h (see FIGS. 5 and 6).

The processes illustrated and explained in FIGS. 5-7 may take place in particular by means of the schematic block circuit diagram, shown in FIG. 3, of the first exemplary embodiment as per FIG. 1 in the form of the so-called standalone version.

In conjunction with the second exemplary embodiment as per the schematic block circuit diagram in FIG. 4, in particular in a so-called integrated version, together with an active pressure regulating module, for example controller 50, the friction point can be determined by measurement of the brake pressure and of the movement of the brake feed lever 9 when a setpoint pressure is reached. In this case, an evaluation of the possible travel displacement from a measured characteristic curve value in relation to a stored setpoint characteristic curve can be performed.

Figure 8:
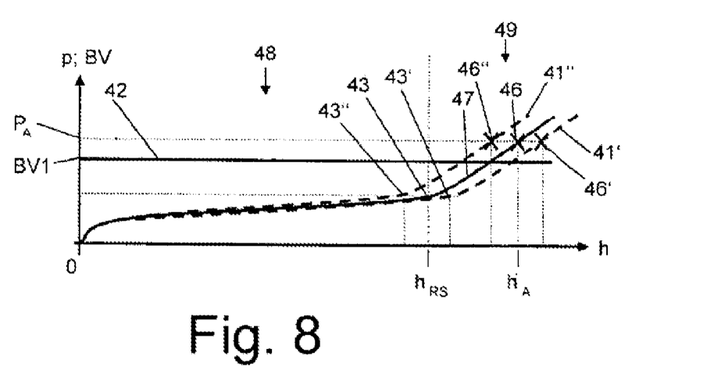
FIG. 8 shows a further schematic diagram regarding the identification of an air clearance.

In FIG. 8, the pressure p of the brake-application device of the brake and the pad wear BV are plotted on the ordinate versus the lever feed travel h (abscissa).

The brake pressure is indicated as a solid setpoint characteristic curve 47 (similar to FIGS. 5 and 6) between two dashed curves of brake pressure 41' and 41". In this case, the setpoint characteristic curve 47 runs through the friction point 43, which is assigned to the lever feed travel setpoint friction point $h_{RS}$. The brake pressure curves 41' and 41" run in each case through a respectively associated friction point 43' and 43" to the left and right of the friction point 43, wherein said friction point 43 forms a mean value of the two other friction points 43' and 43".

Precise and permanent friction point monitoring is possible by means of a pressure measurement at a settled braking point 46, 46', 46". The braking point 46 is an intersection point of a straight line, which corresponds to a compensation pressure PA, for example to a value of 1.5 bar, with the setpoint characteristic curve 47. A line parallel to the ordinate through the braking point 46 corresponds, on the abscissa, to a compensation travel point $h_A$, wherein the braking point 46 corresponds to a mean value of the two other braking points 46' and 46". The other braking points 46' and 46" are each intersection points of the compensation pressure PA with one of the curves of brake pressure 41' and 41".

The setpoint characteristic curve 47 is a stored pressure/travel characteristic curve, on the basis of which the friction point monitoring is performed in the controller by way of comparison. The value of the lever feed travel h detected by the feed lever sensor 37, which value is permanently available, and the pressure p measured by a pressure sensor (not shown) are used for this purpose. The pressure p is measured in the steady state in the range of the brake feed movement 49. Detection of the friction point 43, 43', 43" may be realized by way of an evaluation of the static brake pressure p versus the lever feed travel h (in a manner dependent on a movement of the brake feed lever 9), for example by setpoint/actual characteristic curve comparison.

If, for example, the braking point 46' is determined, it is possible in this way to detect that the associated friction point 43' has shifted from the setpoint value of the friction point 43 toward higher h values, as indicated by the curve of brake pressure 41'. Thus, pad wear is detected which must be readjusted, as will be explained below in conjunction with FIG. 10.

Figure 9:
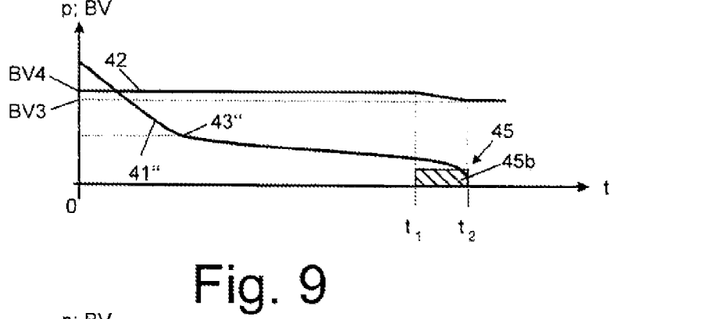
FIG. 9 shows a further schematic diagram regarding the increase of an air clearance.

A determined braking point 46" with the associated curve of brake pressure 41" indicates for example that the friction point 43" has shifted from the setpoint value of the friction point 43 toward lower h values. Thus, retraction of the brake pads 2 can be performed in order to correct the air clearance and prevent grinding of the brake pads 2. FIG. 9 will be used to explain this.

FIG. 9 shows a further schematic diagram regarding the increase of the air clearance, wherein a pressure p of the brake-application device of the brake and a pad wear BV are plotted on an ordinate—by contrast to FIG. 8—versus a time t (abscissa).

The pad wear sensor value 42 corresponds to a pad wear BV4 at which the friction point 43" (see FIG. 8) has been detected and retraction is necessary. Upon the release of an applied brake, at a time t1 toward the end of the curve of brake pressure 41', electromagnetic clutch operation 45, as air clearance increase operation 45b, is activated, wherein the pad wear readjustment device 1, as described above, retracts the pads 2 until the electromagnetic clutch operation 45 ends at a time t2. At the time t2, a pad wear sensor value 42 is reached which corresponds to a pad wear BV3. The air clearance has thus been increased again, and the pads 2 no longer grind.

Figure 10:
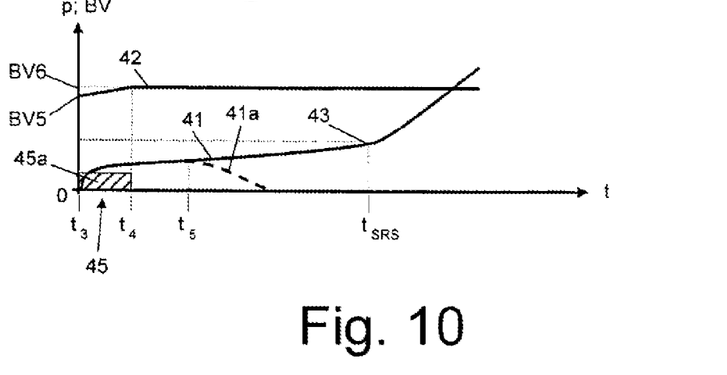
FIG. 10 shows a schematic diagram regarding the reduction of an air clearance.

FIG. 10 shows a further schematic diagram regarding the reduction of the air clearance, wherein the pressure p and the pad wear BV are plotted on the ordinate—by contrast to FIG. 8—versus the time t (abscissa), as in FIG. 9.

As has been described above in conjunction with FIG. 8, after detection of the friction point 43' and of an associated pad wear BV5, it is detected that a readjustment of the brake pads 2 is necessary. During a subsequent brake-application process illustrated in FIG. 10, at the start of the curve of brake pressure 41, electromagnetic clutch operation 45, as air clearance reduction operation 45a, is activated at a time t3, wherein the pad wear readjustment device 1 effects a readjustment or feed movement of the pads for reduction of the air clearance as described above, until a corresponding pad wear BV6 is reached. The air clearance reduction operation 45a ends in this case at a time t4. In this way, the curve of the brake pressure 41 corresponds again to the setpoint characteristic curve 47 (FIG. 8) with the friction point 43 which corresponds to the setpoint friction point which is assigned a setpoint friction point time $t_{RS}$.

The electromagnetic clutch operation 45 for the readjustment or retraction of the brake pads 2 may optionally take place at the start of the brake feed movement 49 after the air clearance has been passed through, for example shortly before the friction point (FIG. 6) is reached, after the brake feed movement 49 at the end of the release of the brake-application device (t1 . . . t2 in FIGS. 7 and 9) or else outside the brake feed movement 49. In this case, the expression "outside the brake feed movement 49 or outside a braking operation" means that the brake-application device is actuated only in the range of passage through the air clearance 48, without a friction point 43, 43', 43" being fully reached.

Electromagnetic clutch operation 45 outside a braking operation or brake feed movement will now be explained on the basis of FIG. 10. For this purpose, in FIG. 10, a curve profile of brake pressure 41a is illustrated by dashed lines. At the start of the brake-application process at the time t3, electromagnetic clutch operation 45 (either as air clearance reduction operation 45a or as—the illustration shows air clearance reduction operation 45a but air clearance increase operation 45b is easily conceivable) is activated in the initial range of the curve of brake pressure 41 (solid curve 41) and is ended again at the time t4 by the energization of the electromagnetic coil 16 of the clutch device 10 being deactivated. Then, at a subsequent time t5, the brake-application process is ended again, wherein the brake pressure 41a follows the dashed curve profile and returns to zero. During this process, however, no braking action or brake feed movement takes place. Owing to the brake-application movement only within the air clearance, the brake feed lever 9 is adjusted, which in so doing actuates the pad wear readjustment device 1 during electromagnetic clutch operation 45. Since, however, owing to the curved profile of brake pressure 41a, the brake-application movement is ended again, the brake feed lever 9 is also retracted. The friction point 43 is in this case not reached, and thus the brake pads 2 do not bear against the brake disk, and thus no braking process takes place.

The ending of the brake-application movement at the time t5 may also take place after the deenergization of the electromagnetic coil 16 of the clutch device 10 after a presettable delay time at the time t5. The brake-application movement can likewise be ended by means of the lever feed travel h detected by means of the feed lever sensor 37, together with the pad wear value 42 detected by the pad wear sensor 8.

Thus, the air clearance or the pad wear can be regulated, in the event of a deviation of the mean value of the friction point 43 and/or of the braking point 46 from the setpoint characteristic curve 47, by way of the electromagnetic clutch operation 45, that is to say also by way of individual short activation pulses of the electromagnetic coil 16 of the clutch device 10.

The energization of the electromagnetic clutch 16 may for example be realized by means of at least one switching pulse, wherein this may take place outside a braking operation.

By means of the friction point monitoring by way of the braking point 46, 46', 46", it is also possible to attain improved reliability of pressure regulation by way of faster fault detection, for example in the event of a faulty pressure sensor.

The invention is not restricted to the exemplary embodiments described above. It can be modified within the scope of the appended claims.

Accordingly, it is conceivable for the pivoting movement of the brake feed lever 9 to be sensed in some way other than that described above.

The electromagnetic coil 16 may also have two or more coils.

LIST OF REFERENCE SIGNS

1 Brake wear readjustment device
2 Brake pad
3 Readjustment spindle
4 Readjustment shaft
5 Output gear
5a Brake-application spring
6 Transmission end
7 Transmission gear
8 Pad wear sensor
8a Wear sensor element
8b Wear encoder element
9 Brake feed lever
10 Clutch device
11 Rotary drive element
12 Gear mesh
13 Clutch cover
13a Clutch region
13b Connecting section
13c Wall section
14 Clutch section
15 Clutch gap
16 Electromagnetic coil
17 Line
18 Connecting line
19, 19a Connecting element
20, 21 Axial stop
22 Stop delimiting element
23 Friction section
24 Brake housing
25 Chain
26 Outer bearing
27 Coil carrier
27a Disk section
28 Terminal device
29 Printed circuit board
30 Housing
31 Plug connection
32 Thrust washer
33 Clutch element
34 Retracting spring
35 Cover
36 Brake-application spring
37 Feed lever sensor
37a Feed sensor element
37b Feed encoder element
38 Carrier shaft
38a Carrier section
38b Carrier toothing
39 Bearing
40 Toothed segment
40a Toothed segment holder
41, 41', 41", 41a Brake pressure
42 Pad wear sensor value
43, 43', 43" Friction point
44 Intersection point
45 Electromagnetic clutch operation
45a Air clearance reduction operation
45b Air clearance increase operation
46 Braking point
47 Setpoint characteristic curve
48 Passage through air clearance
49 Brake feed movement
50 Controller
51 Control device
52 Clutch switch
53 Voltage regulator
BV, BV1 ... 6 Pad wear
h Lever feed travel
$h_A$ Compensation travel point
$h_{RS}$ Lever feed travel, setpoint friction point
$h_{RI}$ Lever feed travel, actual friction point
N, S Permanent magnet poles
p, PA Pressure
t, t1 ... t2 Time
$t_{RS}$ Setpoint friction point time The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an electric pad wear readjustment device of a disk brake arrangement and a control device, wherein the disk brake arrangement includes a brake-application device with a brake feed lever and the electric pad wear readjustment device is coupled to the brake feed lever and located in a readjustment spindle of the disk brake, comprising the acts of:
   detecting an air clearance between a brake disk and a brake pad of the disk brake arrangement;
   comparing the air clearance with a preset value to determine whether the air clearance has changed from the preset value; and
   controlling the electric pad wear readjustment device with the control device by energizing an electromagnetic coil of a clutch device of the electric pad wear readjustment device to adjust a position of the readjustment spindle during a movement of the brake feed lever.

2. The method as claimed in claim 1, wherein
   the act of detecting the air clearance includes detecting a lever feed travel of the brake feed lever.

3. The method as claimed in claim 2, wherein
   the act of detecting the air clearance includes determining a friction point corresponding to contact between the brake pad and the brake disk on the basis of a transmission of force by the readjustment spindle and the lever feed travel and determining an adjustment movement of the electric pad wear readjustment device in the event of energization of the electromagnetic coil.

4. The method as claimed in claim 1, wherein
   the detection of the air clearance includes comparing a pressure measurement at a preset braking point comparison with a preset setpoint characteristic curve.

5. The method as claimed in claim 4, wherein
   the detection of the air clearance includes identifying a friction point corresponding to contact between the brake pad and the brake disk on the basis of an evaluation of a measured static brake pressure relative to a movement of the brake feed lever.

6. The method as claimed in claim 1, wherein
   if an increase of the air clearance has been determined in the act of comparing the air clearance, the act of controlling the electric pad wear readjustment device includes energizing the electromagnetic coil during a brake-application movement of the brake feed lever.

7. The method as claimed in claim 1, wherein
if a decrease of the air clearance has been determined in the act of comparing the air clearance, the act of controlling the electric pad wear readjustment device includes energizing the electromagnetic coil during a brake-retraction movement of the brake feed lever.

8. The method as claimed in claim 5, wherein
the act of controlling the electric pad wear readjustment device during the movement of the brake feed lever includes energizing the electromagnetic coil at least one of
- immediately before the air clearance preset value has been passed through during a brake-application movement of the brake feed lever,
- at or immediately after the air clearance preset value has been passed through during a brake-application movement of the brake feed lever, and
- during a brake-retraction movement of the brake feed lever.

9. The method as claimed in claim 1, wherein
the electromagnetic coil is energized by at least one switching pulse.

10. The method as claimed in claim 9, wherein
the electromagnetic coil is energized by pulse width modulation.

11. The method as claimed in claim 10, wherein
the energization of the electromagnetic coil provides an adjustable overload clutch functionality.

12. A disk brake arrangement, comprising:
a brake-application device having a brake feed lever;
an electric pad wear readjustment device insertable into a readjustment spindle of the disk brake arrangement;
a control device,
wherein
the electric pad wear readjustment device is coupled to the brake feed lever and includes
a readjustment shaft with an outer bearing,
a rotary drive element,
a clutch device configured to switchably couple the rotary drive element to the readjustment shaft using at least one electromagnetic coil, and
the control device is configured to
detect an air clearance between a brake disk and a brake pad of the disk brake arrangement;
compare the air clearance with a preset value to determine whether the air clearance has changed from the preset value; and
control the electric pad wear readjustment device with the control device by energizing the electromagnetic coil to adjust a position of the readjustment spindle during a movement of the brake feed lever.

13. The disk brake arrangement as claimed in claim 12, wherein
the electric pad wear readjustment device includes at least one pad wear sensor.

14. The disk brake arrangement as claimed in claim 12, wherein
the electric pad wear readjustment device includes at least one feed lever sensor.

15. The disk brake arrangement as claimed in claim 12, wherein
the control device is co-located with the electric pad wear readjustment device.

16. The disk brake arrangement as claimed in claim 12, wherein
the control device is a part of a vehicle controller.

* * * * *